(12) United States Patent
Bace (10) Patent No.: US 7,200,226 B2
(45) Date of Patent: Apr. 3, 2007

(54) CIPHER BLOCK CHAINING DECRYPTION

(75) Inventor: Matthew M. Bace, North Andover, MA (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 10/655,441

(22) Filed: Sep. 4, 2003

(65) Prior Publication Data

US 2005/0053232 A1 Mar. 10, 2005

(51) Int. Cl.
*H04K 1/04* (2006.01)
*H04L 9/00* (2006.01)

(52) U.S. Cl. ............................ 380/37; 380/29; 380/259
(58) Field of Classification Search .................. 380/37, 380/28, 29
See application file for complete search history.

(56) References Cited

U.S. PATENT DOCUMENTS 6,005,944 A * 12/1999 Blaze .......................... 380/42
6,504,930 B2 * 1/2003 Enari .......................... 380/37

OTHER PUBLICATIONS

"Des Modes of Operation", FIPS Pub. 81, Dec. 2, 1980, download from http://www.itl.nist.gov/fipspubs/fip81.htm on Apr. 30, 2003, 29pgs.
"Advanced Encryption Standard (AES)", FIPS Pub. 197, Nov. 26, 2001, 51pgs.
"Data Encryption Standard (DES)", FIPS Pub. 46-3, Reaffirmed Oct. 25, 1999, U.S. Department of Commerce/National Institute of Standards and Technology, 25pgs.

* cited by examiner

Primary Examiner—Gilberto Barron, Jr.
Assistant Examiner—Samson Lemma
(74) Attorney, Agent, or Firm—Buckley, Maschoff & Talwalkar LLC (57) ABSTRACT

According to some embodiments, cipher block chaining decryption is performed.

24 Claims, 8 Drawing Sheets

FIG. 1

(PRIOR ART)

CIPHER BLOCK CHAINING DECRYPTION

BACKGROUND

A network device may receive encrypted data in accordance with a security protocol. For example, Internet Protocol security (IPsec) is a framework for security protocols at a network or packet processing layer of communication. When a network device receives this type of information, it may need to efficiently decrypt the data.

DETAILED DESCRIPTION

Some embodiments are associated with a "decryption operation." As used herein, the phrase "decryption operation" may refer to any process that decrypts data. For example, a decryption operation may be performed in accordance with the Data Encryption Standard (DES), defined by American National Standards Institute (ANSI) X3.92 "American National Standard for Data Encryption Algorithm (DEA)" (1981), triple-DES, defined by ANSI X9.52 "Triple Data Encryption Algorithm Modes of Operation" (1998), or the Advanced Encryption Standard (AES), as defined by Federal Information Processing Standards (FIPS) publication 197 (2002) and ANSI X9.91 "Advanced Encryption Standard (AES) for the Financial Services Industry" (200X), all of which are examples of symmetric block ciphers.

For example, a sender may encrypt an original message of "plaintext" (P) to create "ciphertext" (C), such as by encrypting P using an encryption key in accordance with DES. The sender can then securely transmit C to a recipient. The recipient decrypts C to re-create the original P (e.g., using a decryption key in accordance with DES).

Figure 1:
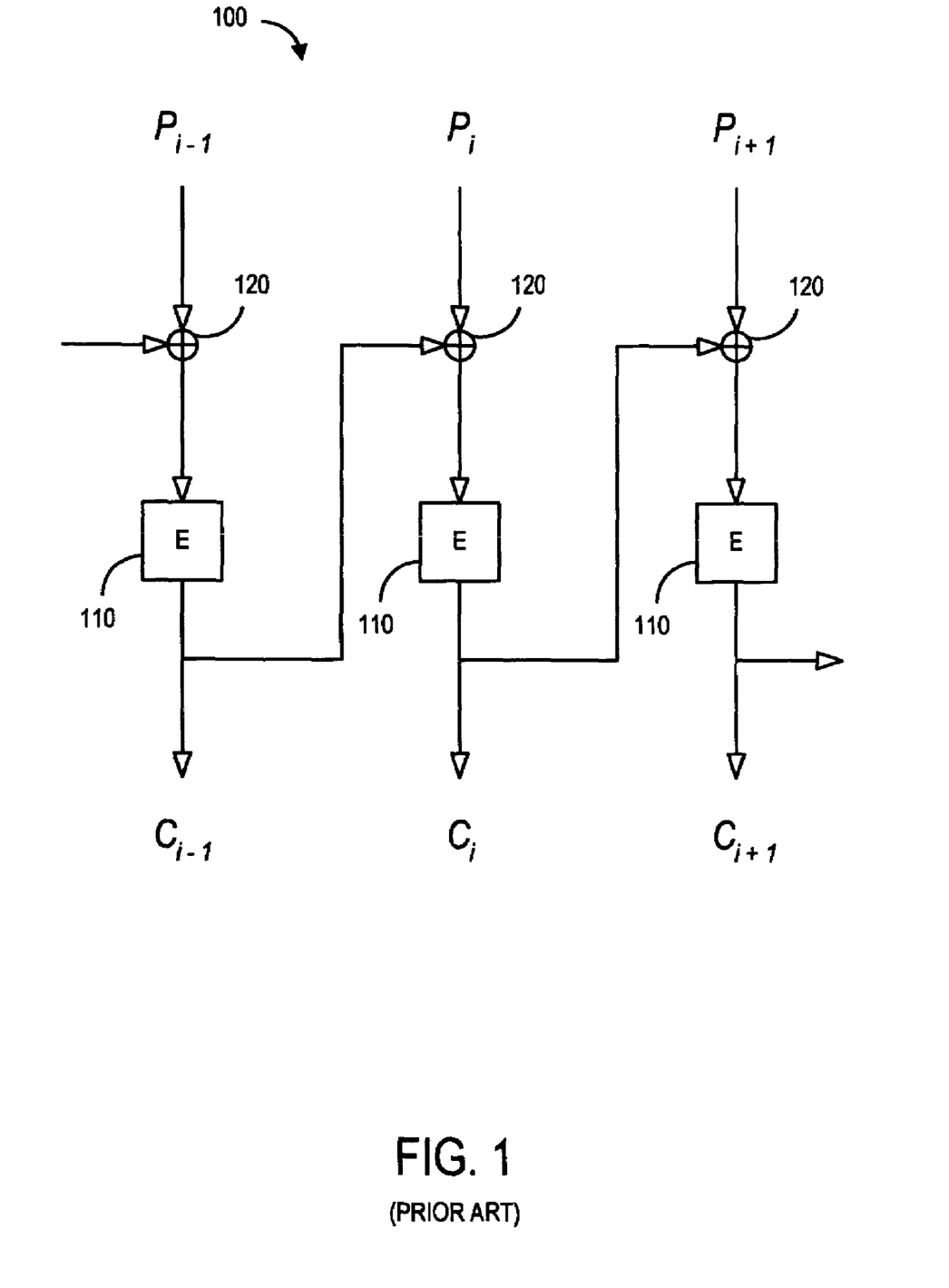
FIG. 1 is an overview of a cipher block chaining encryption process.

In a "block" encryption process, the original P is divided into blocks of information ( . . . $P_{i-1}$, $P_i$, $P_{i+1}$, . . . ). For example, DES divides P into a number of 64-bit blocks. The blocks of plaintext are then used to create blocks of ciphertext ( . . . $C_{i-1}$, $C_i$, $C_{i+1}$, . . . ). To more securely protect P, a Cipher Block Chaining (CBC) encryption process uses information about one block to encrypt or decrypt another block (thus, the blocks are "chained" together). FIG. 1 is an overview of such a CBC encryption process 100 wherein an encryption procedure (E) 110 operates on an input to generate $C_i$. In particular, the input to E 110 is the current block of plaintext ($P_i$) combined with the previous block of ciphertext ($C_{i-1}$) via an exclusive OR (XOR) operation 120. Because the first block ($P_0$) in a chain of plaintext has no previous block to combine with, an Initialization Vector (IV) may be combined with the first block ($P_0$) prior to being encrypted by E 110.

Figure 2:
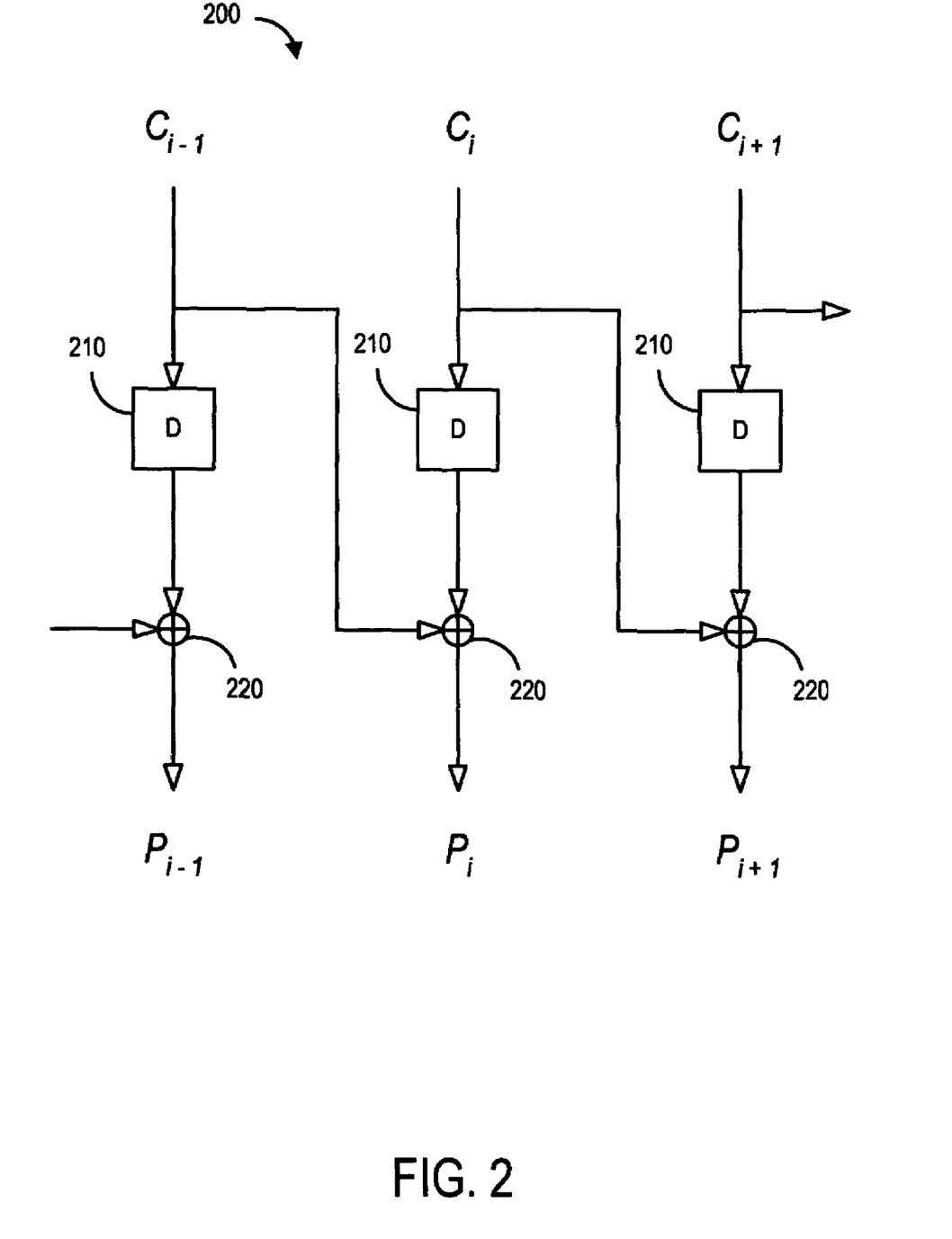
FIG. 2 is an overview of a standard cipher block chaining decryption process.

Similarly, FIG. 2 is an overview of a CBC decryption process 200 wherein a decryption procedure (D) 210 operates on a current block of ciphertext ($C_i$) to generate an output. The output from D 210 is combined with the previous block of ciphertext ($C_{i-1}$) via an XOR operation 220 to re-create the original $P_i$. Similarly, the first block of ciphertext ($C_0$) may be decrypted by D 210 and then combined with the IV to re-create the original $P_0$.

Note that the decryption of plaintext block ($P_i$) depends on both the current ciphertext block ($C_i$) and the previous ciphertext block ($C_{i-1}$). In some cases, however, the previous ciphertext block ($C_{i-1}$) will have already been overwritten by the previous plaintext block ($P_{i-1}$) (e.g., the variable used to store block information may be converted from ciphertext to plaintext). This may be the case, for example, in the following decryption operation as described by pseudo-code:

```
Temp0 = IV
for (i = 0; i < n; i=i+1)
{
    Temp1 = Temp0;
    Temp0 = Array[i];
    Array[i] = Decrypt (Array[i] ^ Temp1);
}
``` where "^" represents an XOR operation, "IV" is the initialization vector, "i" is a counter, "n" is the total number of blocks, and "Array[i]" is an array in memory. Array[i] contains the current ciphertext block ($C_i$) upon entry and the current plaintext block ($P_i$) upon exit.

In this approach a pair of temporary variables (Temp0 and Temp1) are used so that the previous ciphertext block ($C_{i-1}$) can remain in memory even after it is has been decrypted into the previous plaintext block ($P_{i-1}$). Although this may permit an in-place implementation of a CBC decryption operation, it can require a significant amount of data shuffling (e.g., data being moved from one variable to another). Moreover, the amount of data shuffling introduced by this solution may increase latency and decrease decryption performance, especially for large messages or data streams.

As another approach, a decryption operation may be performed as described by the pseudo-code:

```
Array[-1] = IV
for (i = n-1; i >= 0; i=i-1)
{
    Array[i] = Decrypt (Array[i] ^ Array[i-1]);
}
```

In this case, the CBC decryption operation works backwards through the data. As a result, the previous ciphertext block ($C_{i-1}$) will still be available when the current plaintext block ($P_i$) is being decrypted (because $P_i$ has not yet been decrypted). Although this may improve performance as compared to the previously described approach, it may require that the entire message be stored in memory prior to decryption. Note that storing the entire message prior to decryption, particularly for large a message, can add a significant amount of latency (e.g., a system may need to wait for an entire message to be received prior to beginning decryption) and may consume a significant amount of memory. Moreover, the location of the end of the data may need to be determined, and finding the end of a data stream in chained buffer format (e.g., BSD-Unix mbufs) may require the traversal of an entire chain of buffers, which can also increase latency and decrease decryption performance based on the amount of chaining.

Decryption Process

Figure 3:
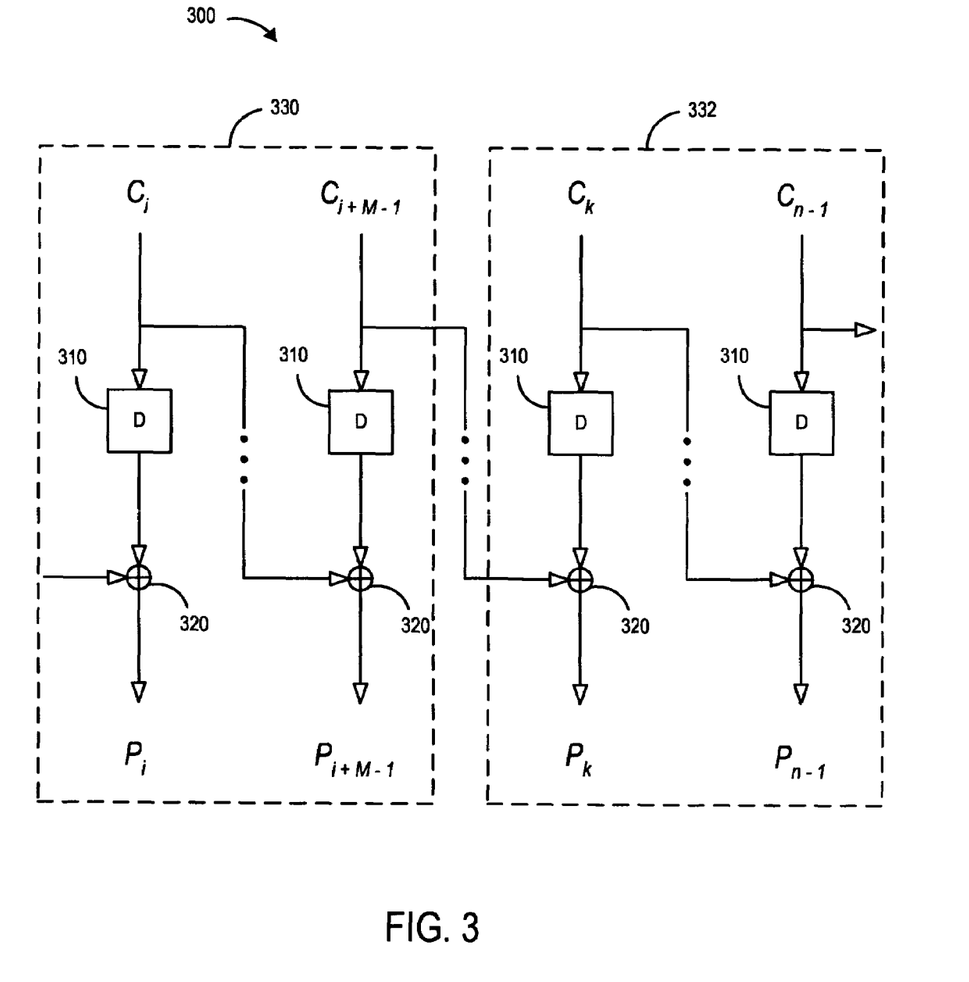
FIG. 3 is an overview of a method according to some embodiments.

FIG. 3 is an overview of a CBC decryption process 300 according to some embodiments. By way of example, consider the following pseudo-code:

```
for (j = 0; j < n; j += M)
{
    T = MIN (j+M-1, n-1);
    Temp = Array[T];
    for (i = T; i >= j+1; i=i-1)
    {
        Array[i] = Decrypt (Array[i] ^ Array[i-1]);
    }
    Array[j] = Decrypt (Array[j]) ^ IV;
    IV = Temp;
}
``` where "j" is a counter, and "M" is the number of blocks in a set as will now be described.

The CBC decryption operation 300 may be implemented by dividing a ciphertext block chain (e.g., an encrypted message) into "sets" 330, 332. As used herein, the term "set" may refer to a grouping of "M" number of ciphertext blocks. A set may generally comprise as few as two ciphertext blocks (M=2), or as many as half the number of total ciphertext blocks in a message (M=n/2). In some embodiments, the number of blocks in a set (M) may vary between one or more sets. For example, a first set may contain a first number of blocks (M[0]), a second set may contain a second number of blocks (M[1]), and so on. The decryption operation using sets with variable numbers of blocks (M[s]) may be described by the pseudo-code:

```
s=0;
do
{
    T = MIN (j+M[s]-1, n-1);
    Temp = Array[T];
    for (i=T; i>=j+1; i=i-1)
    {
        Array[i] = Decrypt (Array[i] ^ Array[i-1]);
    }
    Array[j] = Decrypt (Array[j] ^ IV);
    IV = Temp;
    j = j + M[s];
    s = s + 1;
} while (j<n)
``` where "s" is a counter. Where sets with variable numbers of blocks (M[s]) are used, a set may contain as few as one ciphertext block (M[s]=1) or up to one fewer than the total number of ciphertext blocks (M[s]=n-1).

Some embodiments are associated with ordered sets. An ordered set is a set containing blocks that are associated with a fixed and identifiable order within the set, and/or within the message itself.

The CBC decryption operation 300 is performed on a first set 330, comprising a current ciphertext block ($C_i$) through a last ciphertext block in the set 330 ($C_{i+M-1}$). Within the set 330, the decryption operation 300 is performed in reverse order starting with the last ciphertext block in the set 330 ($C_{i+M-1}$), and ending with the first ciphertext block in the set 330 ($C_i$). If the current ciphertext block ($C_i$) is the first block in the message ($C_0$), the CBC decryption operation 300 utilizes the decryption procedure (D) 310 to decrypt the ciphertext block ($C_0$) and then combines the result with the IV (via an XOR operation 320) to produce the original first plaintext block ($P_0$).

According to some embodiments, the total number of ciphertext blocks (n) may not be an exact multiple of the number of sets (i.e., not evenly divisible by M). For example, a message consisting of ten ciphertext blocks may be divided into two sets, the first set having eight blocks, and the last set having two blocks. The index for the first block in the last set may therefore be generally identified by a variable "k" defined by the formula:

$$k=((n-1)/M)*M$$

where "k" is the largest multiple of "M" that is less than or equal to "n−1", and "/" represents integer division with truncation toward zero.

Subsequent sets 330 are then similarly processed, with the decrypted last plaintext block in a previous set 330 ($P_{i-1}$) acting as the IV for the first ciphertext block in the current subsequent set ($C_i$). That is, sets are processed in a forward order while blocks within each set are processed in reverse order. The CBC decryption operation 300 continues until the last set 332 is processed. The last set 332 is processed in the same manner as previous sets 330, such that the last ciphertext block in the set 332 ($C_{n-1}$) is decrypted prior to the first ciphertext block in that set 332 ($C_k$). The last deciphered plaintext block of the previous set 330 ($P_{k-1}$) is combined with the result of D 310 as applied to the first ciphertext block in the last set 332 ($C_k$), to create the first plaintext block of the last set 332 ($P_k$).

Method

Figure 4:
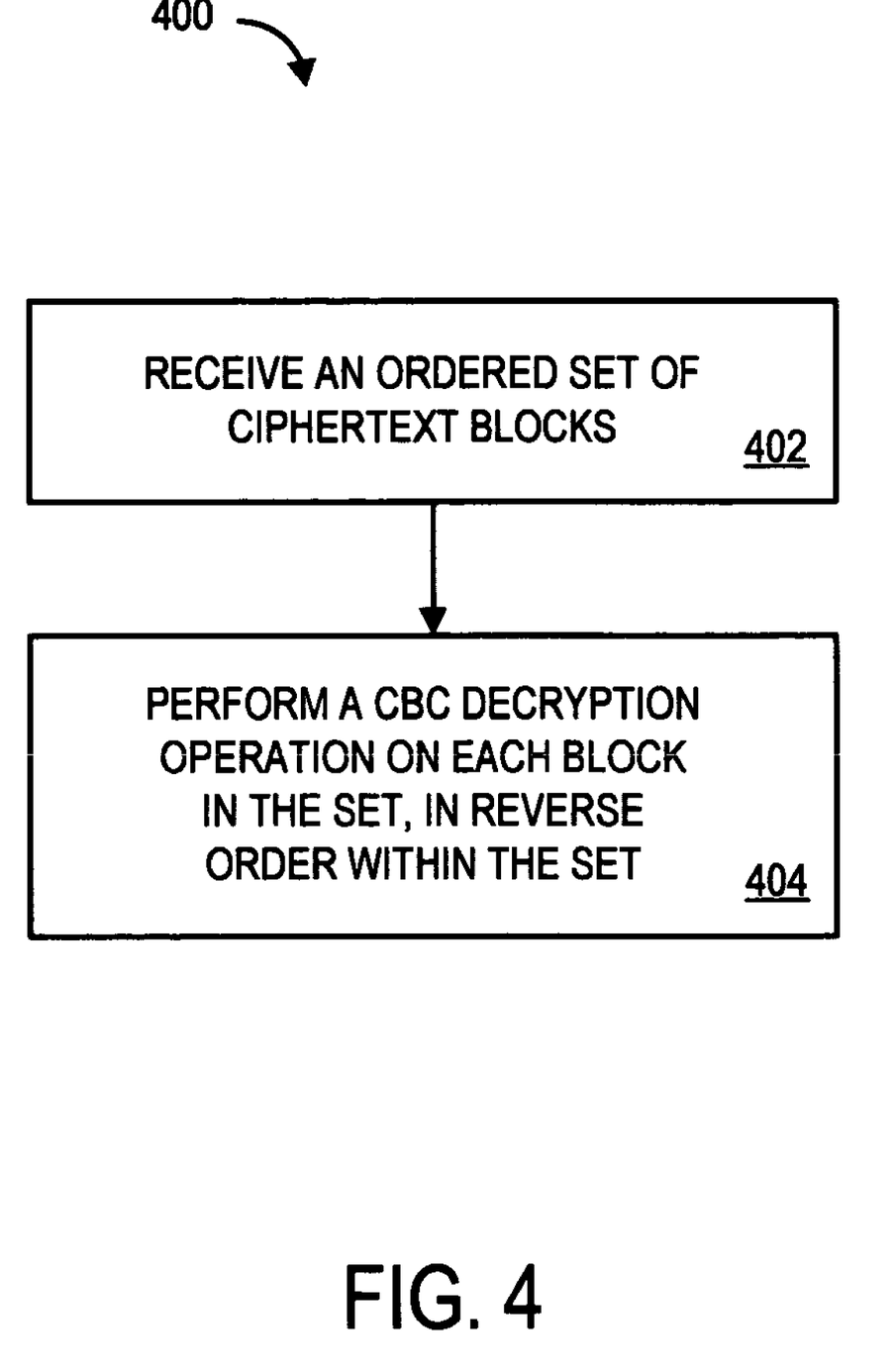
FIG. 4 is a flow diagram of a method according to some embodiments.

FIG. 4 is a flow diagram of a method according to some embodiments. The flow charts described herein do not necessarily imply a fixed order to the actions, and embodiments may be performed in any order that is practicable. The method of FIG. 4 may be associated with, for example, a network device. Note that any of the methods described herein may be performed by firmware, hardware, software, or any combination of these techniques. For example, a storage medium may store thereon instructions that when executed by a machine result in performance according to any of the embodiments described herein.

At 402, an ordered set of ciphertext blocks is received. The set may be retrieved from local or external memory, or may be received directly from another device. A CBC decryption operation is then performed on each block in the set, in reverse order within the set, at 404. Other ordered sets may similarly be received and decrypted until an entire message has been decrypted. The decrypted message may then be stored in memory, used in an application, and/or transmitted to another device.

Note that the entire message might not be stored in memory. Moreover, the end of the data stream may not need to be located before the decryption process begins. In addition, the number of data shuffles may be reduced as compared to other approaches.

Network Processor

Figure 5:
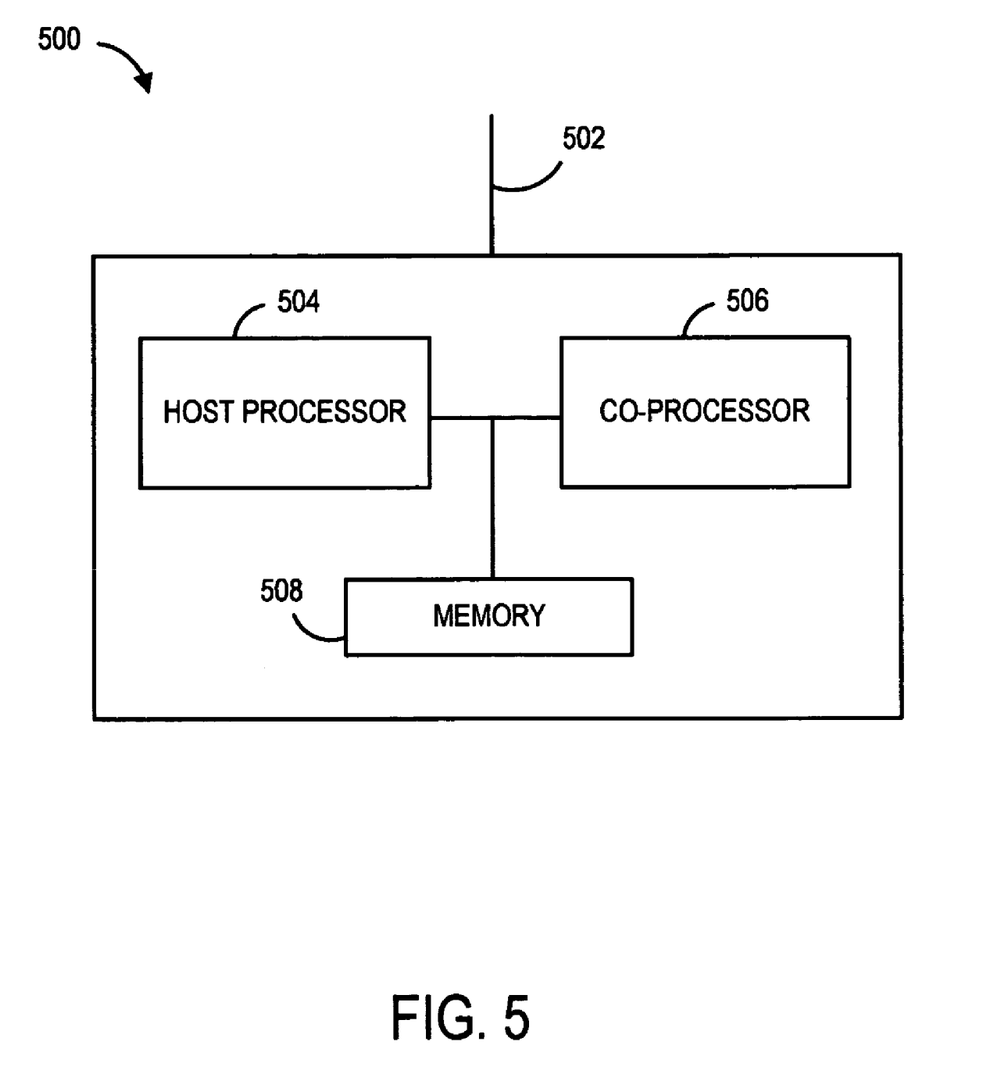
FIG. 5 is a block diagram of an apparatus according to some embodiments.

FIG. 5 is a block diagram of a network processor 500, such as an INTEL® IXP 425 network processor. The network processor 500 may receive and/or transmit, for example, encrypted Asynchronous Transfer Mode (ATM) information (e.g., through one or more paths 502). For example, ATM information may be exchanged in accordance with ATM Forum Technical Committee document number AF-TM-0121.000 entitled "Traffic Management Specification Version 4.1" (March 1999). The path 502 may be an input and/or an output path. As used herein, the terms "path", "input path", and "output path" may generally refer to any port, thread, bus, connection, cable, wired or wireless communication device, or any part, portion, or combination thereof.

The network processor 500 may include a host processor 504, a co-processor 506, and a memory 508. The host processor 504 may manage incoming and outgoing signals and/or information, direct the co-processor 506 to perform certain operations and/or calculations, and manage, read, edit, or write to the memory 508. The co-processor 506 may perform computational, logical, and/or programmatic functions such as the decryption operation 300 described herein. Either and/or both processors 504, 506 may include multiple processing microengines (not shown) which may, for example, be arranged in a microengine cluster and/or may each have multiple processing threads. The memory 508 may be physical memory, virtual memory, and/or Random-Access Memory (RAM). The memory 508 may be local memory attached to and/or residing within the network processor 500, external memory in connection with the network processor 500, and/or any combination thereof. In some embodiments, the memory 508 may include a local memory attached to each microengine and an external memory in communication with the network processor 500.

The network processor 500 may, according to some embodiments, include only a single processor, or may have multiple host and/or co-processors. Further, according to some embodiments, the network processor 500 or of it's elements may determine a value "M" (the number of blocks in a set) to be utilized in a CBC decryption operation 300. Note that the value "M" maybe varied to balance the tradeoffs between memory usage and latency to improve the decryption operation for a particular computer, network, software, and/or firmware platform or implementation.

Information Storage

Figure 6:
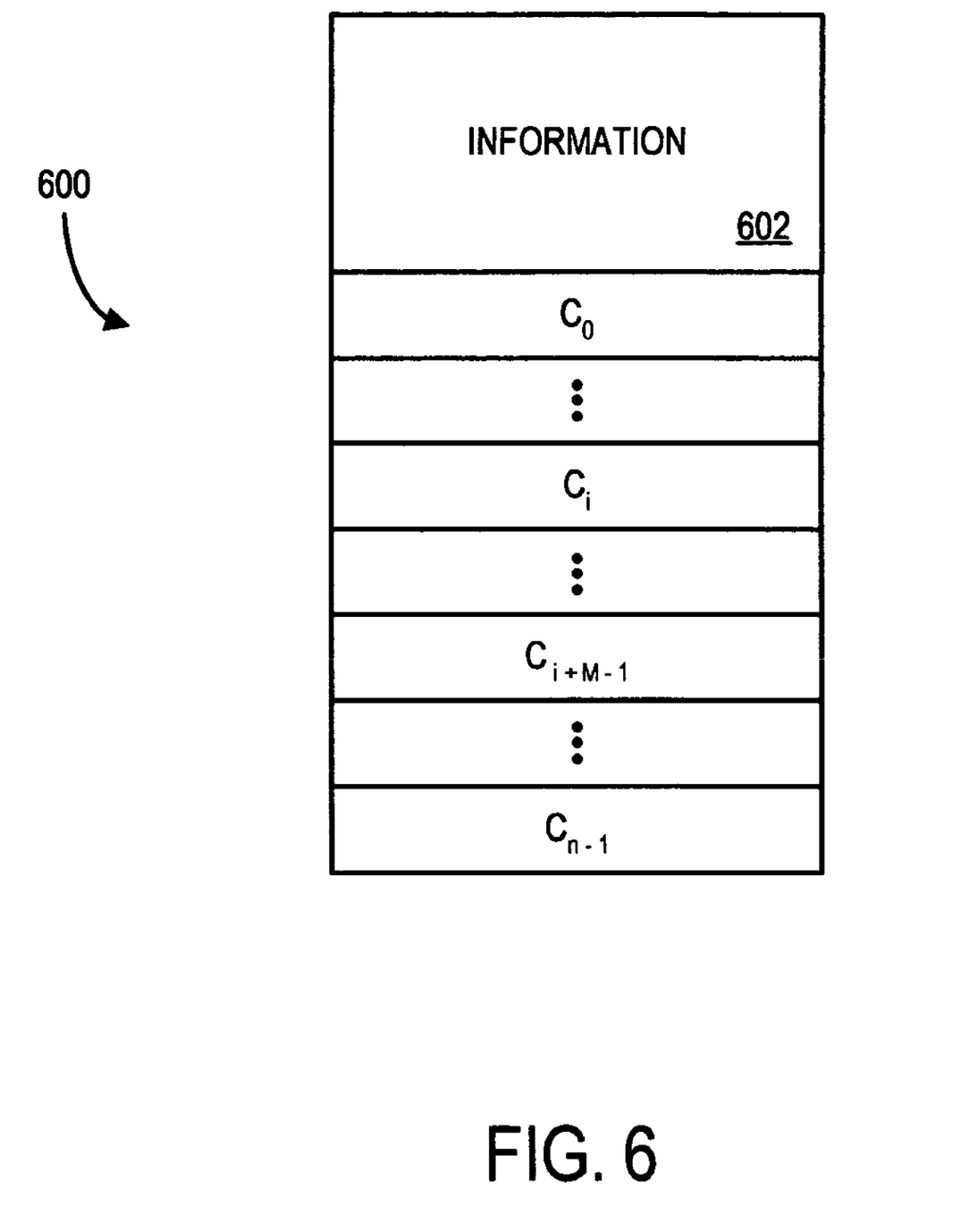
FIGS. 6 and 7 illustrate how information may be stored according to some embodiments.

FIG. 6 illustrates how information 602 may be stored in a memory unit 600, according to some embodiments. In some embodiments, the memory unit 600 is an "external" memory (e.g., external to a processor that performs a decryption operation). As illustrated, the memory unit 600 may store a series of ciphertext blocks (e.g., an encrypted cipher block chain from a first block $C_0$ through a last block $C_{n-1}$). Moreover, the series may include a number of sets, each set having M blocks (e.g., from $C_i$ through $C_{i+M-1}$) where M is at least two. According to some embodiments, decryption is performed on each set in the order the set is stored in the memory unit 600 (e.g., the set that begins with C0 would be decrypted before the set that begins with $C_i$).

Figure 7:
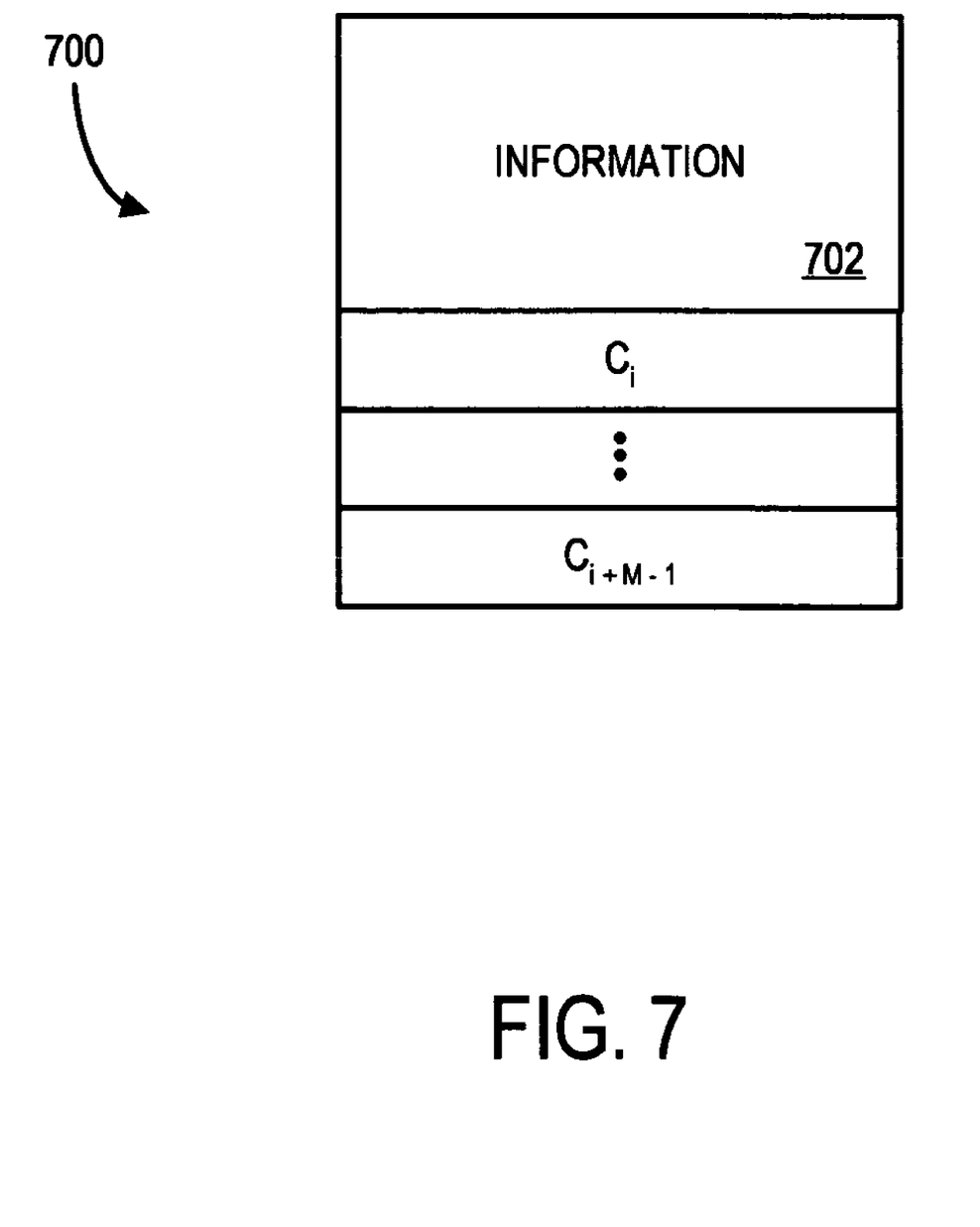

FIG. 7 illustrates how information 702 may be stored in a memory unit 700, according to some embodiments. In some embodiments, the memory unit 700 is an local or "internal" memory (e.g., internal or efficiently accessed by a processor that performs a decryption operation). As illustrated, the memory unit 700 may store one set of ciphertext blocks (e.g., a portion of an encrypted cipher block chain from $C_i$ through $C_{i+M-1}$). According to some embodiments, each block is decrypted in reverse of the order the block is stored in the memory unit 70 (e.g., block $C_{i+M-1}$ would be decrypted before block $C_i$). Note that an IV and a TEMP block may also be store in the memory unit 700 (e.g., the memory unit 700 might actually store M+2 blocks of data).

Thus, according to some embodiments, only a portion of a message (e.g., M blocks) may need to be stored in memory unit 700. Moreover, the information in memory unit 700 may be decrypted before an entire message (e.g., n blocks) is received and/or stored in memory unit 600. In addition, because the blocks in memory unit 700 are decrypted in reverse order, the amount of data shuffling may be reduced (because a prior block will not have been over-written when a current block is being decrypted). As a result, the decryption may be memory efficient decryption and/or an amount of latency may be reduced. Note that the value "M" may be select to balance tradeoffs between memory usage and latency to achieve an appropriate CBC decryption implementation.

System

Figure 8:
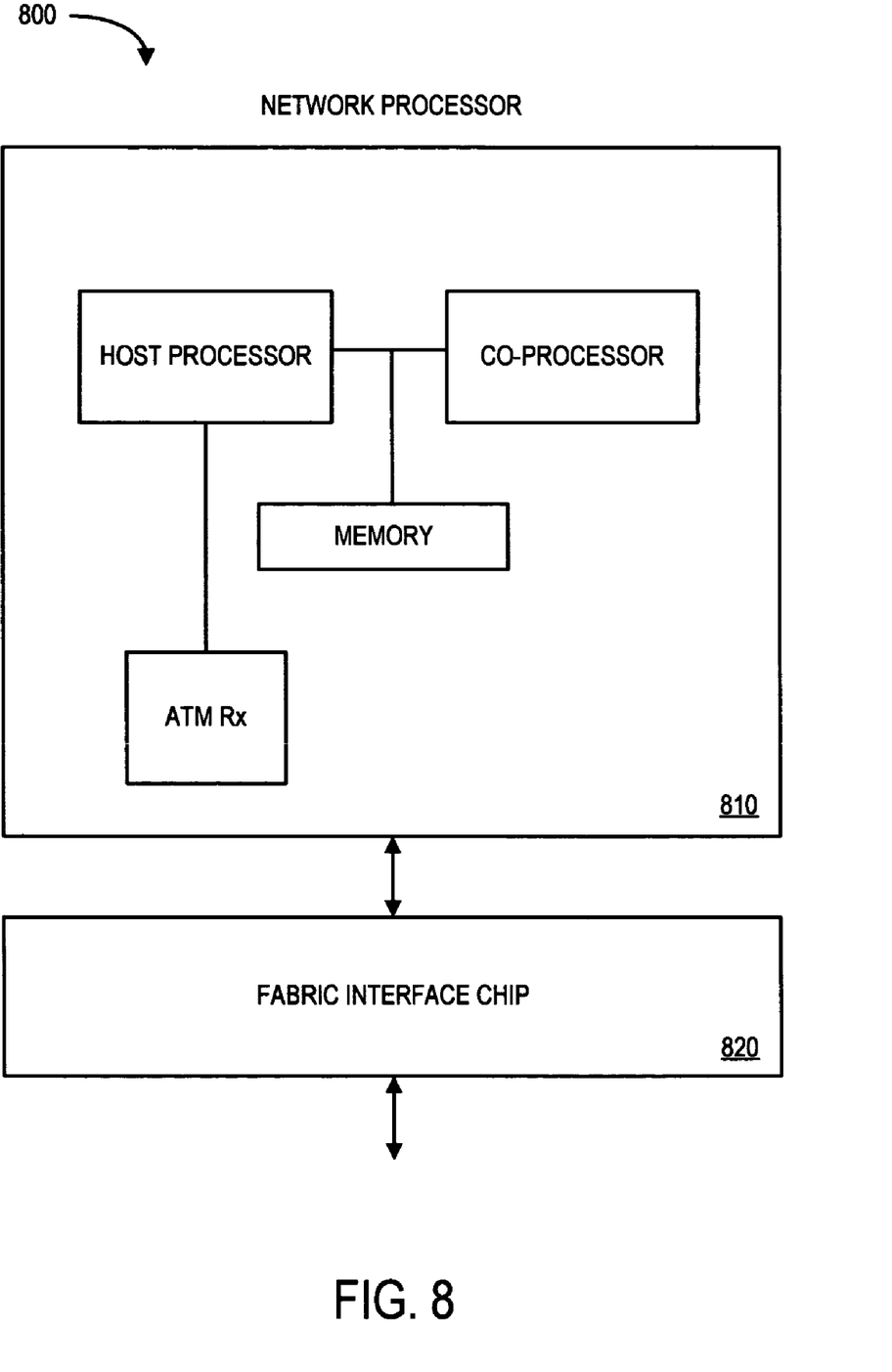
FIG. 8 is a block diagram of a system according to some embodiments.

FIG. 8 is a block diagram of a system 800 according to some embodiments. The system 800 may be associated with, for example, an ATM network switch or router. The system 800 includes a network processor 810 according to any of the embodiments described herein. For example, the network processor 810 might have a host processor, a co-processor, and/or a memory unit to decrypt information associated with an ATM cell.

The network processor 800 is coupled to a fabric interface chip 820 adapted to communicate through a switch fabric. For example, the fabric interface chip 820 might arrange for ATM information to be exchanged with another device.

The several embodiments described herein are solely for the purpose of illustration. Persons skilled in the art will recognize from this description other embodiments may be practiced with modifications and alterations limited only by the claims.

What is claimed is:

1. A method, comprising:
   receiving a first ordered set of ciphertext blocks, the set being a subset of an encrypted cipher block chain;
   performing a cipher block chaining decryption operation on each block in the first set, a later-ordered block being decrypted prior to an earlier-ordered block;
   receiving a subsequent ordered set of ciphertext blocks;
   performing a cipher block chaining decryption operation on each block in the subsequent set, a later-ordered block being decrypted prior to an earlier-ordered block;
   generating a first set of plaintext blocks; and
   generating a second set of plaintext blocks,
   wherein the earlier ordered block of the first set is combined via an operation to the decrypted later-ordered ciphertext block of the subsequent set.

2. The method of claim 1,
   wherein the earlier ordered block of the first set is combined via an XOR to the decrypted later-ordered ciphertext block of the subsequent set.

3. The method of claim 1, further comprising:
   determining a number of ciphertext blocks to include in an ordered set of ciphertext blocks.

4. A method according to claim 1, wherein the ordered set is stored in local memory and another subset of the encrypted cipher block chain is stored in external memory.

5. A method according to claim 1, wherein the decryption operation is performed on a block in the ordered set before another subset of the encrypted cipher block chain is received.

6. A method according to claim 1, wherein the decryption operation is performed by a co-processor.

7. An article of manufacture comprising:
a computer readable medium having stored thereon instructions which, when executed by a processor, cause the processor to:
receive a first ordered set of ciphertext blocks, the set being a subset of an encrypted cipher block chain:
perform a cipher block chaining decryption operation on each block in the first set, a later-ordered block being decrypted prior to an earlier-ordered block;
receive a subsequent ordered set of ciphertext blocks;
perform a cipher block chaining decryption operation on each block in the subsequent set, a later-ordered block being decrypted prior to an earlier-ordered block;
transmit a first set of plaintext blocks; and
transmit a second set of plaintext blocks,
wherein the earlier ordered block of the first ordered set of ciphertext blocks is combined via an operation to the decrypted later-ordered ciphertext block of the subsequent ordered set of ciphertext blocks.

8. The article of claim 7, the medium having further instructions which, when executed by the processor, cause the processor to:
receive a subsequent ordered set of ciphertext blocks.

9. The article of claim 7, the medium having further instructions which, when executed by the processor, cause the processor to:
determine a number of ciphertext blocks to include in an ordered set of ciphertext blocks.

10. The article of claim 7, wherein the ordered set is stored in local memory and another subset of the encrypted cipher block chain is stored in external memory.

11. The article of claim 7, wherein the decryption operation is performed on a block in the ordered set before another subset of the encrypted cipher block chain is received.

12. The article of claim 7, wherein the decryption operation is performed by a co-processor.

13. An apparatus comprising:
an input path to receive a first ordered set of ciphertext blocks and a subsequent set of ciphertext blocks, the first set and the subsequent set being a subset of an encrypted cipher block chain;
a decryption unit to perform a cipher block chaining decryption operation on each block in the first set and the subsequent set, a later-ordered block being decrypted prior to an earlier-ordered block in each set, wherein an earlier ordered block of the first ordered set of ciphertext blocks is combined via an operation to a decrypted later-ordered ciphertext block of the subsequent ordered set of ciphertext blocks;
a first output path to transmit a first set of plaintext blocks; and
a second output path to transmit a set of plaintext blocks.

14. The apparatus of claim 13, further comprising:
a processor to determine a number of ciphertext blocks to include in an ordered set of ciphertext blocks.

15. The apparatus of claim 13, further comprising:
an output path to transmit a set of plaintext blocks.

16. The apparatus of claim 13, further comprising:
a local memory to store the ordered set.

17. The apparatus of claim 16, further comprising:
a co-processor to perform the decryption operation.

18. The apparatus of claim 16, wherein the ordered set is stored in the local memory and another subset of the encrypted cipher block chain is stored in external memory.

19. The apparatus of claim 13, wherein the decryption operation is performed on a block in the ordered set before another subset of the encrypted cipher block chain is received.

20. A network switch, comprising:
a network processor, comprising:
an input path to receive a first ordered set of ciphertext blocks and a subsequent ordered set of ciphertext blocks, the first ordered set of ciphertext blocks and the subsequent ordered set of ciphertext blocks being subsets of an encrypted cipher block chain;
a first output path to transmit a first set of plaintext blocks;
a second output path to transmit a set of plaintext blocks;
a decryption unit to perform a cipher block chaining decryption operation on each block in the first ordered set of ciphertext blocks and the subsequent ordered set ciphertext blocks, a later-ordered block being decrypted prior to an earlier-ordered block in each set, wherein the earlier ordered block of the first set is combined via an operation to a decrypted later-ordered ciphertext block of the subsequent set; and
an asynchronous transfer mode interface.

21. The network switch of claim 20, wherein the network processor further comprises:
a local memory to store the ordered set, and
an external memory to store another subset of the encrypted cipher block chain.

22. The network switch of claim 21, wherein the network processor further comprises:
a plurality of microengines.

23. The network switch of claim 22, wherein each of the plurality of micro engines includes a plurality of threads.

24. The network switch of claim 22, wherein each of the plurality of microengines includes at least a portion of the local memory.

* * * * *